April 17, 1956  B. H. WARD  2,742,192
SEED PLANTER

Original Filed March 31, 1949  2 Sheets-Sheet 1

INVENTOR.
BERNARD H. WARD
BY J. William Freeman
ATTORNEY

April 17, 1956  B. H. WARD  2,742,192
SEED PLANTER
Original Filed March 31, 1949  2 Sheets-Sheet 2
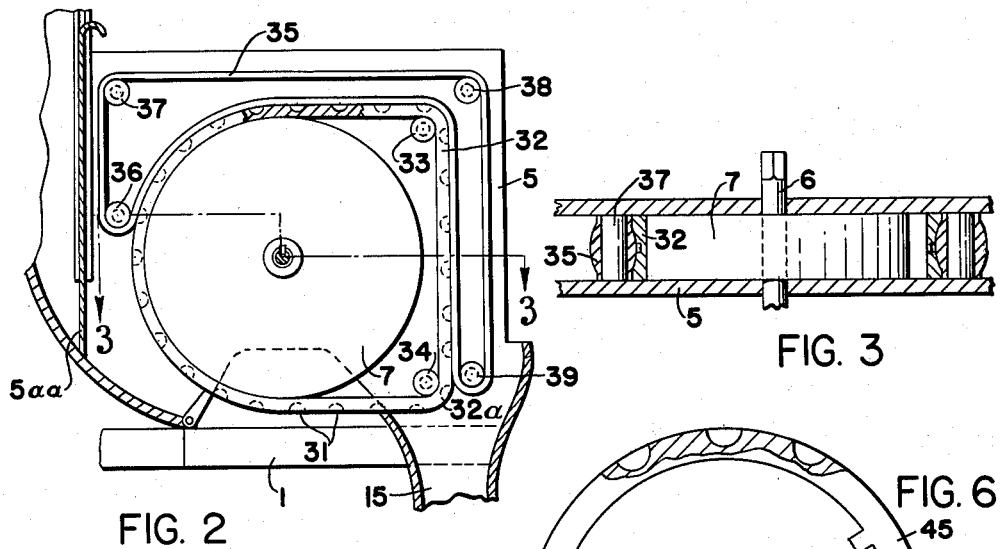
FIG. 2
FIG. 3
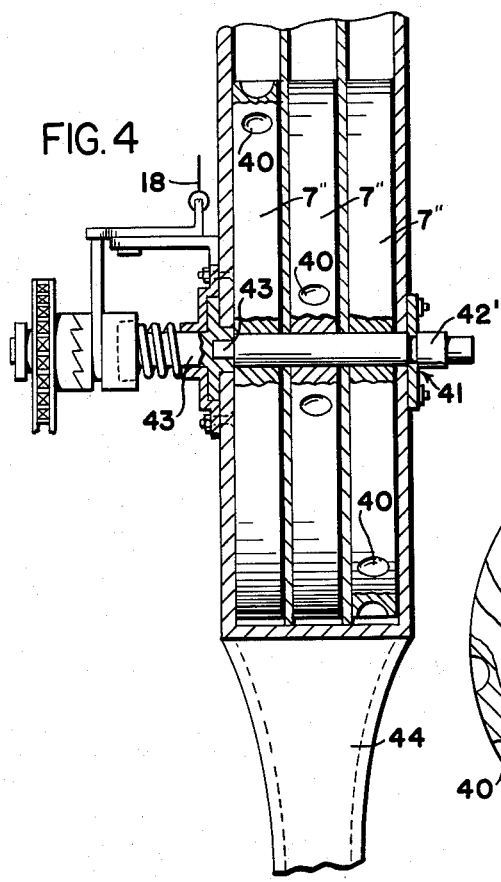
FIG. 4
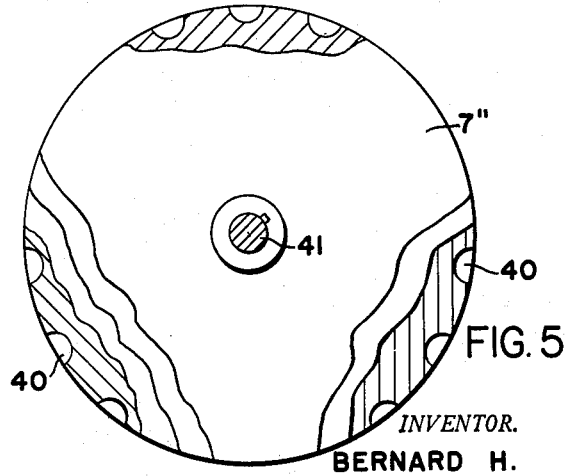
FIG. 6
FIG. 5
INVENTOR.
BERNARD H. WARD
BY J. William Freeman
ATTORNEY

United States Patent Office 2,742,192
Patented Apr. 17, 1956

2,742,192

SEED PLANTER

Bernard H. Ward, Atwater, Ohio, assignor to Ward Mac-Fry Development Company, a corporation of Ohio Original application March 31, 1949, Serial No. 84,718, now Patent No. 2,605,023, dated July 29, 1952. Divided and this application July 28, 1952, Serial No. 301,185

4 Claims. (Cl. 222—139)

This invention relates to improvements in seed planters.

The object of the invention is to provide a seed planter having a rotary seed pick-up having a series of pockets to pick up seed from a hopper and a flexible cover or protector operatively associated with the rotary seed pick-up to retain the seed in the pockets during the period or interval between the time the seed are gathered in the pockets until delivery for planting.

A further object of the invention is to provide a rotary seed pick-up, the periphery of which is slightly concaved to readily gather seed and deliver same to a series of pockets.

A further object of the invention is to provide a rotary seed pick-up and a flexible cover or protector for the seed, cooperating with the periphery of the pick-up and frictionally operated in conjunction with the pick-up in transmitting the seed when picked up until the seed are delivered to planting position.

Another object of the invention is to provide a seed pick-up and a flexible endless belt-like cover to protect and retain the picked-up seed in transit from the time the seed are picked up until same are delivered to planting position.

While my invention is particularly designed to pick up individual seeds and deliver same in spaced relation when planting in rows, the rotary seed pick-up disc and the associated flexible cover employed to hold the seed in the pockets in the disc is not limited to use with the pockets. Therefore, it is one of the objects of this invention to provide a seed pick-up and cover, capable of use for picking up individual seeds and delivering same in the usual spaced relation in rows or picking up the seed and thereafter broadcasting same.

My invention is so constructed and arranged that additional units may be added, so that seed of one type which grow quickly or seed of a different type which grow slowly can be simultaneously planted.

The invention also comprehends improvements in the details of construction and arrangement of parts which will be hereinafter described and particularly pointed out in the claims.

Figure 2 is an enlarged vertical section of the seed pick-up disc and covering belt.

Figure 3 is a section of the same on line 3—3 of Figure 2.

Figure 4 is a vertical section illustrating a plurality of discs in the hopper.

Figure 5 is a side view of several discs, typical of the installation shown in Figure 4, parts being broken away to illustrate the location of the respective pockets.

Figure 6 is a detail view of a disc with an annulus thereon and in which seed pockets are formed.

Figure 1:
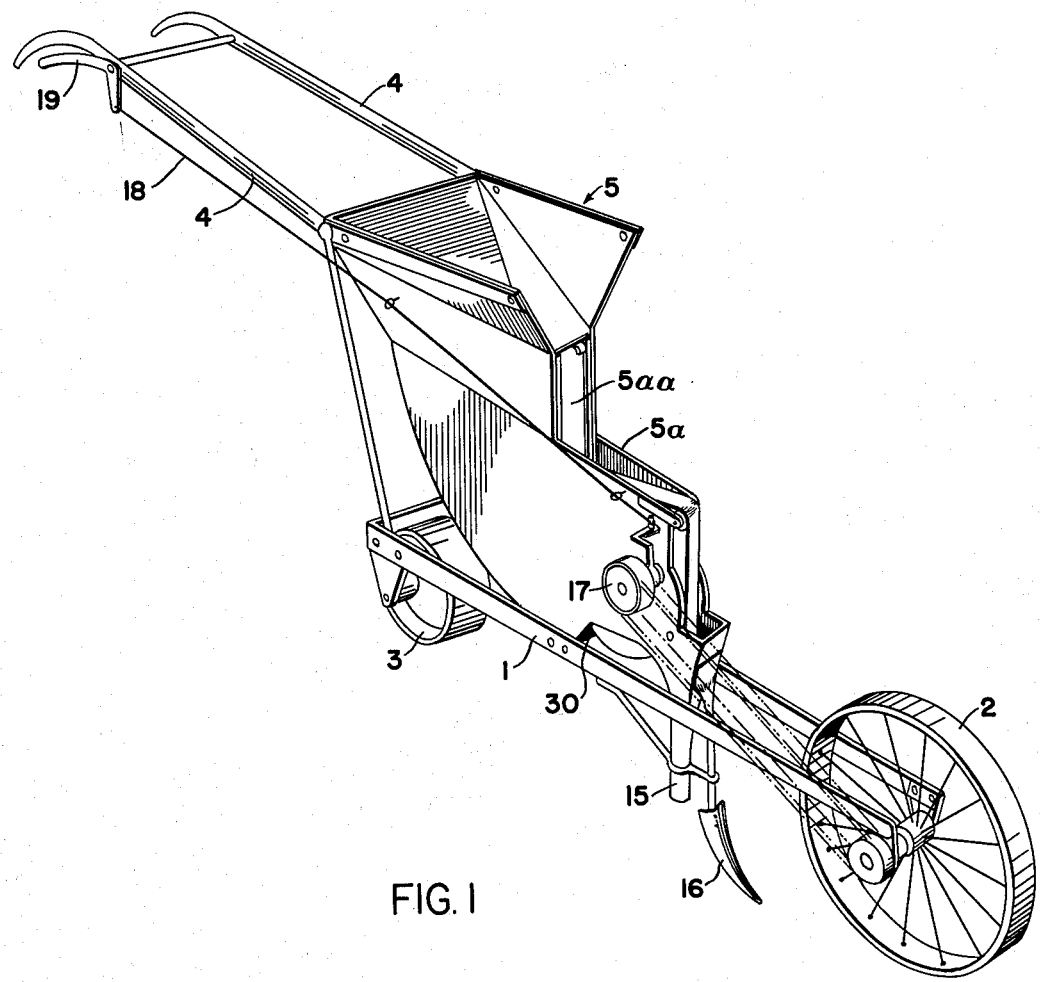
Figure 1 is a perspective view of the improved seed planter.

Referring now to the drawings and in particular to Figures 1 to 3 thereof, 1 indicates a frame mounted on a forward traction wheel 2 and a rear supporting or covering wheel 3. Rising from the frame are handles 4, and mounted on the frame 1 between the handles is a hopper 5, the lower or bottom portion of which inclines downwardly and forwardly to the open end 5a. Mounted on a shaft 6 in the open end of the hopper is a rotary seed pick-up disc generally indicated as 7, the details of which will be presently described.

At the appropriate place in front of the disc 7 is a spout 15 to direct the seed falling from the pockets to the row below. In front of the spout is a small plow 16 to form a trench in the row, while the rear traction wheel serves to cover up the seed deposited by the spout.

The disc is rotated through the medium of a chain and sprocket wheels 17 between the shafts of the disc and the forward traction wheel.

On the shaft 6 is a clutch of the nature described in my copending parent application, S. N. 84,718, filed March 31, 1949, and which is operated through connections 18 with a lever 19 on one of the handles to engage or disengage the power from the disc.

With particular reference now to the detailed operation of the disc 7, the same is shown as being frictionally engageable with an endless flexible belt 32, having the exteriorly presented surface 32a thereof provided with a series of pockets 31 for reception therein of the desired seeds to be planted. This belt 32 trails over the rear portion of the disc 7, then extends forwardly over a roller 33, then extends around a roller 34, thence rearwardly and trained around the disc 7 as shown best in Figure 2.

Arranged over a portion of the belt 32 is an endless covering flexible belt 35. This covering belt is trailed around a roller 36 mounted in the hopper in rear of the disc, thence up and around a second roller 37, and then forwardly around a third roller 38, then down and around a fourth roller 39, thence up and in contact with the surface of the belt 32 to the roller 36. Thus, in this arrangement, the seed are first picked up in the hopper in the same way as will be subsequently shown and described and conveyed to the forward part of the hopper and delivered to the spout and planted.

In this construction, it is manifest that the seed are protected and covered from the time they are picked up until they reach the point of delivery for planting.

In operation, seeds are dropped in the hopper and accumulate around the disc 7 and obviously fall in the pockets 31 of the belt 32. As the disc is rotated, the seed in the pockets come under the belt or cover 35 and are confined due to the movement of the periphery of the disc and the endless belt. Then, when the pockets leave the confining influence of the belt, the seed drop into the spout 15 to the row below.

If for any reason it be desired to stop rotation of the disc, the clutch is operated and the apparatus can be moved about without waste of seed. To clean the hopper, a hinged door 30 is provided.

The invention, as heretofore stated, contemplates the use of the machine for planting different kinds of seed requiring different periods of time to develop. Accordingly, in Figure 4 I have shown three different compartments in the hopper. In each compartment is a disc 7″ formed on a portion of its periphery with pockets 40. For instance, as shown in Figure 5, one disc will have pockets 40 for say about one-third or less of its circumference and on the two adjacent discs pockets will be formed. The pockets on number two and three discs will be disposed out of horizontal alignment with the pockets in the first-mentioned disc, as shown for instance in Figure 5.

In this form of the invention, the discs are mounted on a two-part shaft 41. One part 42 is mounted in one side of the hopper, as shown at 42', and its inner end is square and inserted in a square socket 43' in the end of the second part 43 of the shaft. This second part 43 of the shaft is mounted in a bearing to secure it in position on the opposite side of the hopper, as shown in Figure 4. This part 43 carries the clutch mechanism to control rotation of the discs.

The three compartments deliver the seed to a common spout 44, which in turn delivers the seed from the respective discs in line in a single row in spaced-apart intervals.

When it is desired to change the discs having a different number of pockets, the shaft section 41 is removed, which frees the discs to permit their removal for insertion of other discs having differently arranged pockets.

In lieu of having the pockets formed in the periphery of the discs, I may provide discs 7''' of smaller diameter. On each of the discs 7''' I mount a ring-like member 45, in the periphery of which the pockets are formed, as shown in Figure 6. By this means, I may have in hand a series of rings, each having a different combination of pockets to accommodate different kinds of seed and the length of the rows of such seed to be planted in a single row.

To properly direct the seed in the bottom of the hopper to the disc and covering belt, a sliding partition 5aa is arranged in front of the disc. Of course, when using the form of the invention shown in Figure 4, there will be a sliding partition in each compartment.

Other modifications may be resorted to without deviating from the spiral thereof or the scope of the appended claims.

This application is a divisional application of my parent application S. N. 84,718, filed March 31, 1949, for Seed Planters, now Patent No. 2,605,023, dated July 29, 1952.

I claim:

1. A seed planter, comprising a hopper divided into compartments, a rotatable disc in each compartment mounted on a shaft having clutch means therein, a flexible belt trailed around each disc, and a series of pockets formed between the belt and the discs to pick up seeds; and a collecting funnel interconnecting said compartments whereby seed picked up by said discs will be delivered to said funnel upon disengagement between said belt and said disc after a predetermined period of rotation of said disc for planting.

2. A seed planter, as defined in claim 1, wherein the periphery of each disc is provided with a series of pockets, the pockets of each disc being disposed at different arcuate points on the periphery of said discs, whereby seeds will be successively deposited from said adjacent discs.

3. A seed planter, comprising a hopper, a disc mounted in the hopper; a series of idler rolls; a flexible band trailing around said disc and said idler rolls and provided with a series of seed pick-up pockets; a second set of idler rolls; and a second flexible belt trailing over said second mentioned idler rolls and contacting a segment of the first-mentioned belt to cover the picked up seed from picked-up position to released position in front of the hopper.

4. A seed dispensing mechanism of the character described, comprising; a rotatable disc; a series of idler rolls; an endless flexible belt movable in a closed cyclic path around said disc and said rolls and having one face thereof provided with inwardly presented pockets; a second series of idler rolls; a second endless covering belt trailed over said second mentioned idler rolls for movement in a closed cyclic path thereabout and being frictionally engageable with said first mentioned flexible belt during a selected period of movement in said respective closed cyclic paths, whereby said pockets are covered during a selected period of movement in said closed cyclic paths; said first named flexible belt being of greater overall length than the perimeter of said disc whereby the closed cyclic path thereof is different than the arc of revolution of said disc.

References Cited in the file of this patent

UNITED STATES PATENTS

| Number | Name | Date |
| --- | --- | --- |
| 21,034 | Thomas et al. | July 27, 1858 |
| 64,926 | Whitner | May 21, 1867 |
| 283,317 | Wunsche | Aug. 14, 1883 |
| 379,654 | McTyeire | Mar. 20, 1888 |
| 381,357 | Gardner | Apr. 17, 1888 |
| 441,791 | Davis | Dec. 2, 1890 |
| 648,876 | McKnight | May 1, 1900 |
| 1,115,777 | Briscoe | Nov. 3, 1914 |
| 1,761,065 | Bausman | June 3, 1930 |
| 1,821,009 | Draper | Sept. 1, 1931 |
| 2,174,120 | Cabbley et al. | Sept. 26, 1939 |

FOREIGN PATENTS

| Number | Country | Date |
| --- | --- | --- |
| 140,749 | Germany | Apr. 28, 1903 |
| 200,193 | Great Britain | July 6, 1923 |